United States Patent [19]

Choki et al.

[11] Patent Number: 5,356,717
[45] Date of Patent: Oct. 18, 1994

[54] MAGNETIC CARD HAVING EMBOSSED PORTIONS AND A MAGNETIC LAYER HAVING MAGNETIC POWDERS SPECIFIED BINDER RESINS AND A TENSILE ELONGATION AT BREAK OF 50 PERCENT OR MORE

[75] Inventors: Koji Choki, Itami; Masaharu Saito, Ibaraki; Kunimasa Kobayashi, Narashino; Toru Tachiwada, Koshigaya; Katsufumi Awaya, Kawaguchi, all of Japan

[73] Assignee: Sumitomo Bakelite Company Limited, Tokyo, Japan

[21] Appl. No.: 993,656

[22] Filed: Dec. 21, 1992

[30] Foreign Application Priority Data

Dec. 24, 1991 [JP] Japan ................................ 3-341391

[51] Int. Cl.$^5$ .............................................. G11B 05/00
[52] U.S. Cl. ............................ 428/425.9; 428/482; 428/522; 428/523; 428/694 B; 428/900; 235/493; 283/82; 283/904; 360/2
[58] Field of Search ........... 428/694, 900, 692, 694 B, 428/425.9, 482, 522, 523; 235/49.3; 283/82, 904; 360/2

[56] References Cited

U.S. PATENT DOCUMENTS

| 3,908,065 | 9/1975 | Stigen ................................ 428/329 |
| 4,849,618 | 7/1989 | Namikawa et al. ................. 235/493 |

FOREIGN PATENT DOCUMENTS

| 0366570 | 10/1989 | European Pat. Off. . |
| 62-162228 | 7/1987 | Japan . |
| 1-023478 | 5/1989 | Japan . |
| 2-212194 | 8/1990 | Japan . |
| 2-249696 | 10/1990 | Japan . |
| 2-218013 | 11/1990 | Japan . |
| 2221425 | 7/1990 | United Kingdom . |

Primary Examiner—Stevan A. Resan
Attorney, Agent, or Firm—Browdy and Neimark

[57] ABSTRACT

Disclosed is a magnetic card which comprises a substrate of a thermoplastic resin and a magnetic recording layer provided on the whole surface of at least one side of the substrate, wherein necessary matters such as letters and figures can be formed in a given area by embossing treatment, and wherein the magnetic recording layer consists of a magnetic film which contains 70% by weight or more of magnetic powders having a coercive force of 300 Oe or higher and which has a tensile break elongation of 50% or more.

5 Claims, 6 Drawing Sheets

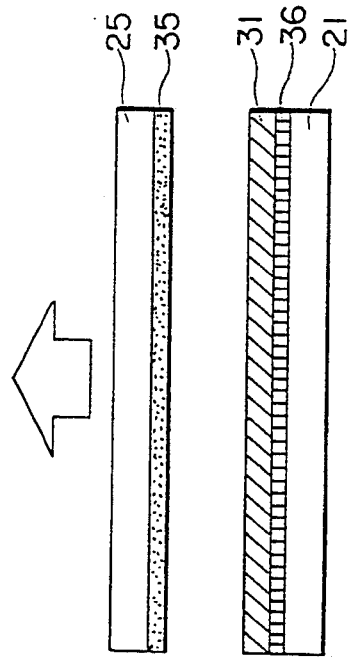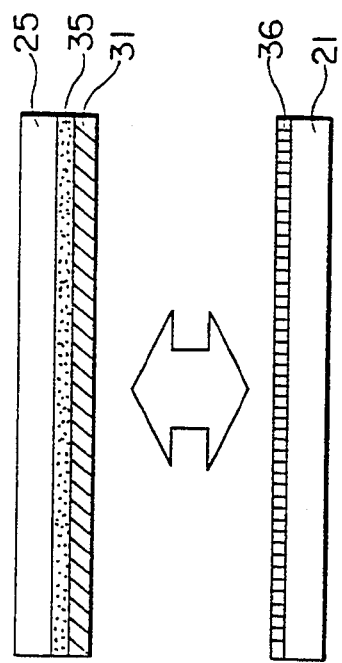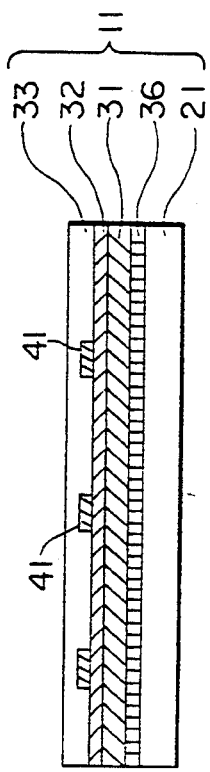

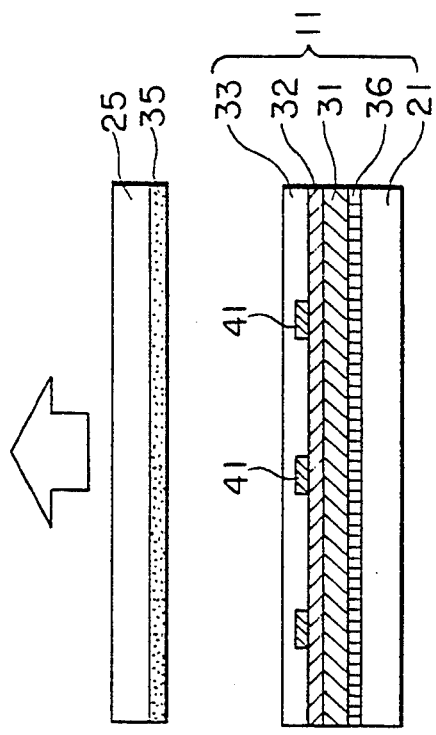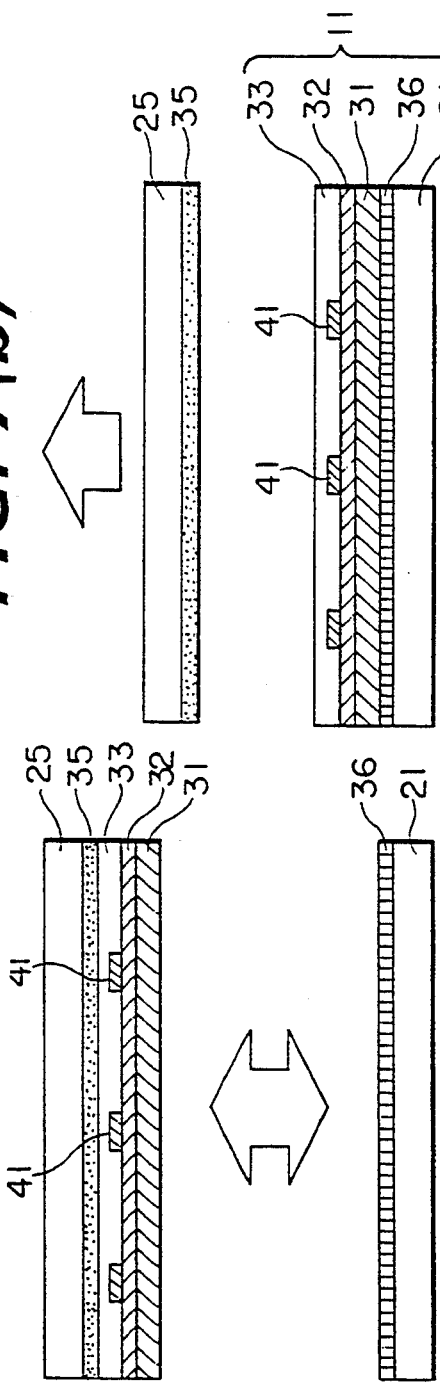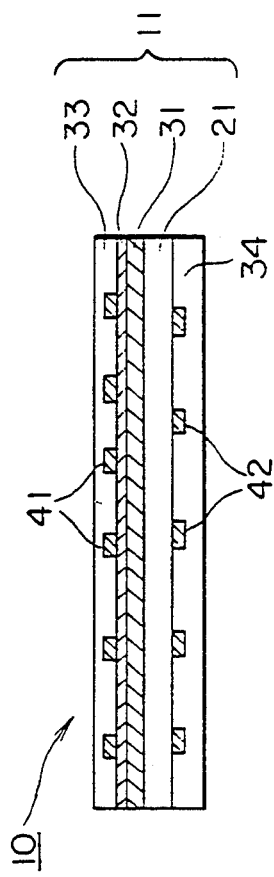

MAGNETIC CARD HAVING EMBOSSED PORTIONS AND A MAGNETIC LAYER HAVING MAGNETIC POWDERS SPECIFIED BINDER RESINS AND A TENSILE ELONGATION AT BREAK OF 50 PERCENT OR MORE

FIELD OF THE INVENTION

The present invention relates to magnetic cards such as credit cards, cash cards for bank and identification cards which have a magnetic recording layer, and in a given area of which the desired matters such as letters and figures can be written by embossing process.

BACKGROUND OF THE INVENTION

The magnetic cards which comprise a substrate of a thermoplastic resin and a magnetic recording layer provided thereon at a given width and in a given direction, and in a given area of which the desired matters such as letters and figures can be formed by an embossing process, have been widely used as credit cards, cash cards for banking, identification cards, cards for oil filling, cards for shopping and others.

These conventional magnetic cards comprise a thermoplastic resin sheet of polyvinyl chloride or the like as a substrate and a magnetic recording layer which is called magnetic stripes and formed by heat-transferring or bonding a magnetic layer formed on a PET (polyethylene terephthalate) tape or the like, to the desired portion of the substrate in the form of stripes.

The constitution of these magnetic cards is schematically shown in FIG. 1 and FIG. 2.

FIG. 1 shows a conventional magnetic card, The magnetic card 10 comprises substrates 21 and 22 of polyvinyl chloride sheets printed with letters or designs 41 and 42, protective layers 34 of transparent polyvinyl chloride sheets through which the letters or designs 41 and 42 can be seen, magnetic stripe 31 heat-transferred or bonded to the protective layer 34 and letters and FIGS. 43 and 44 formed by embossing treatment.

In this constitution, the portion to be printed with letters or designs 41 is limited by the magnetic stripe 31 and therefore the degree of freedom for designs is restricted. Thus, high level of designs are hindered.

Recently, for enhancement of the degree of freedom for designing, such magnetic card 10 as shown in FIG. 2 has been increasingly used. That is, in the magnetic card 10 hiding layer 32 is provided on the whole surface of substrate 23 to which magnetic stripe 31 has been transferred, then the letters or designs 41 are printed on this hiding layer 32 and the printed letters or designs are protected with protective layer 33.

However, formation of the hiding layer 32 which hides the magnetic stripe 31 requires a special technique for hiding the difference in level or in color tone between the magnetic stripe 31 and the substrate 23 of a transparent polyvinyl chloride sheet to which the stripe 31 has been transferred or bonded. As a result, improvement of productivity has been inhibited.

Furthermore, the magnetic stripe 31 is relatively expensive, registration in transferring or bonding of the stripe and registration in cutting of the cards are difficult to cause reduction in the yield. Thus, improvements in material cost and production cost have also been desired.

As an approach to solve the above problems and to provide magnetic cards which are inexpensive and stable in quality and a process for production thereof, it has been proposed to form, in succession, a magnetic recording layer, a hiding layer and a design layer on the whole surface of the substrate of a magnetic card (See Japanese Patent Kokai (Laid-Open) Nos. Sho 48-23337 and 54-73608 and Hei 2-249696). The proposed magnetic cards can solve the problems in material cost and production cost, but they still suffer from the problems that when the desired matters such as letters and figures are formed in a given position of the magnetic cards by embossing treatment, there occur cracking, peeling and exfoliation of the magnetic film in the portions subjected to the embossing treatment to expose the substrate and thus, the appearance is seriously damaged and commercial value is diminished.

SUMMARY OF THE INVENTION

Accordingly, the object of the present invention is to solve the above-mentioned problems, that is, to provide a magnetic card which shows no cracking, peeling and exfoliation of magnetic film in the portions subjected to embossing treatment when the necessary matters such as letters and figures are formed in a given position of the magnetic card by embossing treatment and which has satisfactory electromagnetic conversion characteristics.

The present invention relates to a magnetic card which comprises a substrate of a thermoplastic resin and a magnetic recording layer provided on the whole surface of at least one side of the substrate and in which necessary matters such as letters and figures can be formed in a given area by embossing treatment, characterized in that the magnetic recording layer is formed of a magnetic film which contains 70% by weight or more of magnetic powders having a coercive force of 300 Oe or higher and which has a tensile break elongation of 50% or higher. The magnetic card preferably has the following constitution. That is, preferably the magnetic recording layer is mainly composed of magnetic powders, a binder and a polyisocyanate, and the binder contains at least one resin A selected from the group consisting of vinyl chloride-vinyl acetate copolymer, polyvinyl butyral resin, styrene-maleic acid resin and rosin-modified maleic acid resin and a resin B having a tensile break strength of 500 kg/cm$^2$ or less and/or a tensile break elongation of 100% or higher and selected from the group consisting of polyester resin, polyurethane resin, ethylene-vinyl acetate copolymer, a polyvinyl chloride resin containing a conventional plasticizer and a vinyl chloride-vinyl acetate copolymer containing a conventional plasticizer. On this magnetic recording layer are formed a hiding layer and a design layer in succession, and the magnetic recording layer is a coating layer or a transfer layer. Such magnetic card is preferred. Moreover, electronic parts such as IC may be embedded in this magnetic card.

BRIEF DESCRIPTION OF THE DRAWINGS

FIGS. 4–7 are sectional views illustrating a method for producing the magnetic card of the present invention.

FIGS. 8–9 and 11 are sectional views illustrating other examples of the magnetic cards of the present invention.

Figure 1A:
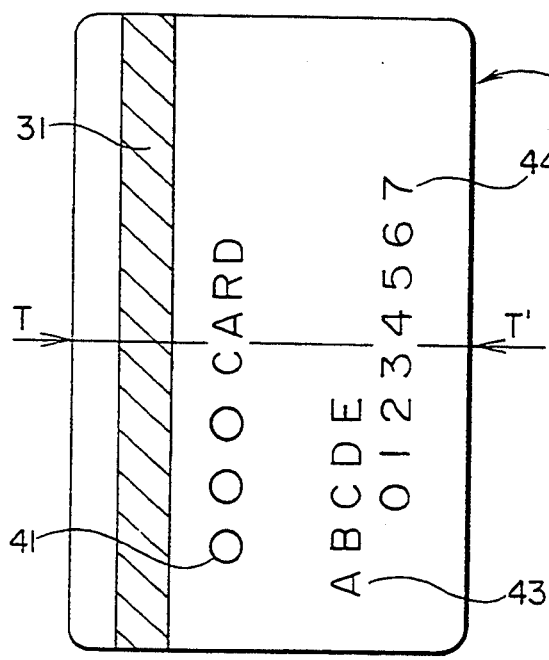
FIGS. 1(*a*) and 2(*a*) are plan views illustrating the constitution of conventional magnetic cards and FIGS. 1(*b*) and 2(*b*) are sectional views of these conventional magnetic cards taken along the lines T-T' in FIGS. 1(*a*) and 2(*a*).
Figure 1B:
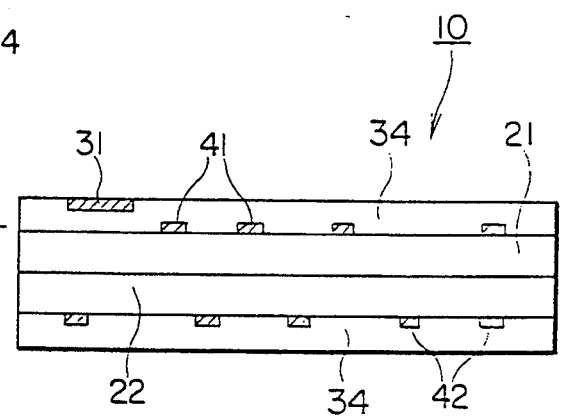
Figure 2A:
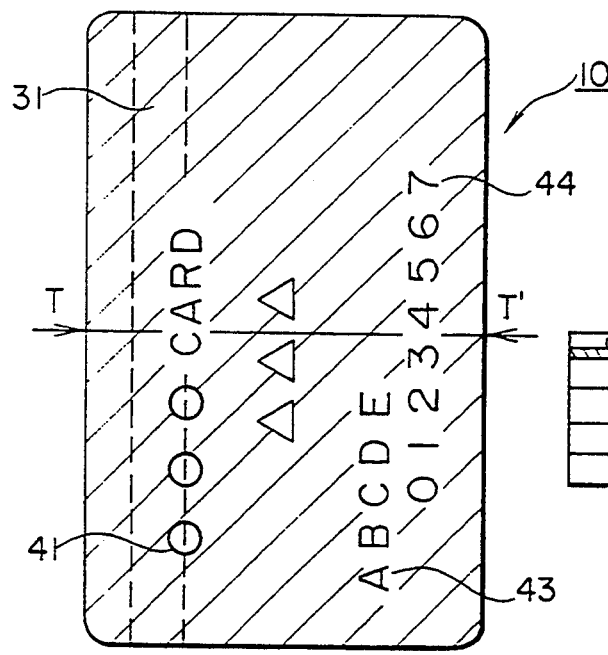
Figure 2B:
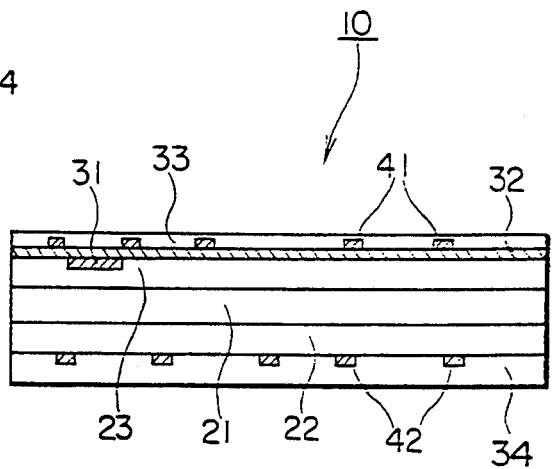

The reference numerals in FIGS. 1–11 have the following meanings.

10 - - - Magnetic card
11 - - - Magnetic sheet
21, 22, 23 - - - Substrates
25 - - - Support
31 - - - Magnetic recording layer
32 - - - Hiding layer
33, 34 - - - Protective layers
35 - - - Peeling layer
36 - - - Adhesive layer
41, 42 - - - Printed letters, designs and others
43, 44 - - - Letters, figures and others formed by embossing treatment

DETAILED DESCRIPTION OF THE INVENTION

The constitution of the magnetic card of the present invention will be explained below referring to the drawings.

Figure 3A:
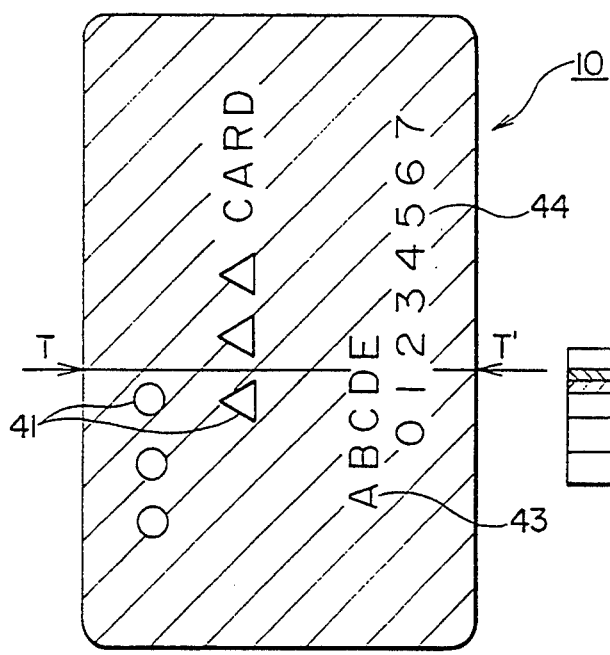
FIG. 3(*a*) is a plan view of one example of the magnetic cards of the present invention and FIG. 3(*b*) is a sectional view of the magnetic card taken along the line T-T' in FIG. 3(*a*).
Figure 3B:
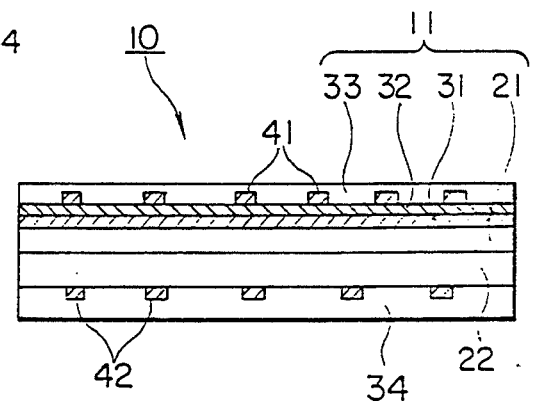

FIG. 3 illustrates one example of the magnetic card 10 of the present invention.

In FIG. 3, 21 and 22 represent thermoplastic resin sheets of polyvinyl chloride or the like which can be subjected to embossing treatment, 31 represents a magnetic recording layer formed on the whole surface of one side of the substrate 21, 32 represents a hiding layer which hides the color of the magnetic recording layer 31, 41 and 42 represent design layers formed by various printing means, 33 represents a protective layer for the design layer 41, which is formed by various printing means, and 34 represents a protective layer for the design layer 42, which is a transparent thermoplastic resin sheet capable of being embossed consisting of polyvinyl chloride or the like. 43 and 44 represent the desired matters such as letters and figures formed by the embossing treatment.

Figure 4:
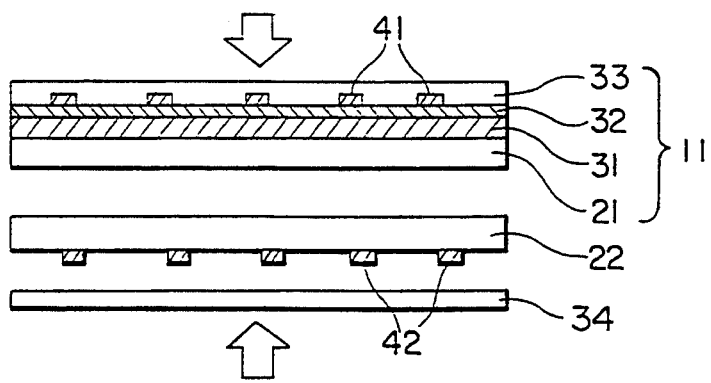

For making this magnetic card 10, as shown in FIG. 4, in the first place magnetic recording layer 31 is formed on the whole surface of one side of the substrate 21 consisting of a thermoplastic resin sheet of polyvinyl chloride or the like. This magnetic recording layer 31 is formed by coating a magnetic coating composition which contains 70% by weight or more of magnetic powders having a coercive force of 300 Oe or higher and which has been prepared so that the finally formed magnetic film has a tensile break elongation of 50% or higher, by known coating methods such as gravure coating, roll coating and knife-edge coating, and drying the coating so as to form a film of about 1–50μ, preferably about 3–20μ thickness. This magnetic recording layer 31 is a coating layer.

Furthermore, hiding layer 32 of 0.01–10μ thickness is formed on the above magnetic recording layer 31 by known methods and additionally, on the hiding layer 32 are laminated the design layer 41 and the protective layer 33 therefor in succession by various printing means to make magnetic sheet 11. This method for making the magnetic sheet 11 is called a coating method.

Another method for making the magnetic sheet 11 is as follows. That is, as shown in FIG. 5, on the whole surface of the peeling layer 35 formed on the support 25 is coated a magnetic coating composition which contains 70% by weight or more of magnetic powders having a coercive force of 300 Oe or higher and which has been prepared so that the finally formed magnetic film has a tensile break elongation of 50% or higher, by known coating methods such as gravure coating, roll coating and knife-edge coating, and the coating is dried to form a film of about 1–50μ, preferably about 3–20μ thickness, and thus the magnetic recording layer 31 is formed as shown in FIG. 5(a). The magnetic recording layer 31 is brought into close contact with the whole surface of one side of the substrate 21 consisting of a thermoplastic resin sheet of polyvinyl chloride or the like with the adhesive layer 36 interposed therebetween and is transferred to the substrate 21 by application of pressure or heat and pressure as shown in FIG. 5(b). Then, the support 25 is peeled off. Further, on the transferred magnetic recording layer 31 is formed the hiding layer 32 of 0.01–10μ thickness by known methods and besides, on the hiding layer 32 are laminated the design layer 41 and the protective layer 33 therefor in succession by various printing means. Thus, the magnetic sheet 11 is obtained as shown in FIG. 5(c).

Figure 6A:
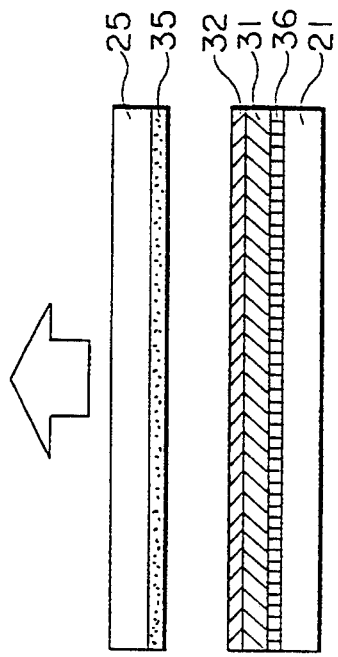
Figure 6B:
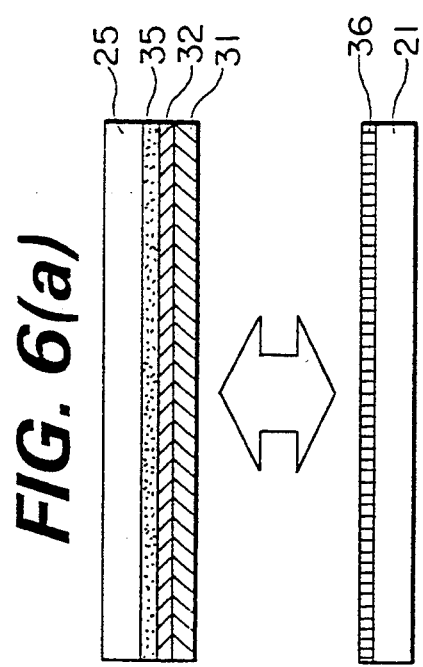
Figure 6C:
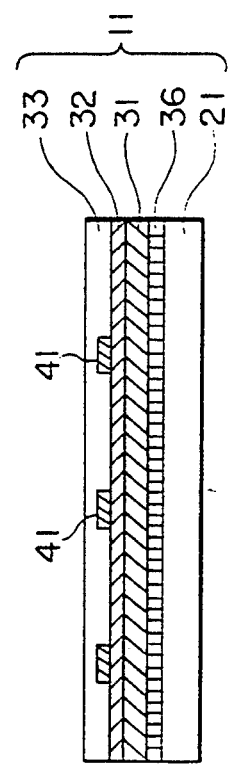

A further method for making the magnetic sheet 11 is as follows. That is, as shown in FIG. 6, the hiding layer 32 of 0.01–10μ thickness is formed, by known methods, on the peeling layer 35 formed on the support 25. On the whole surface of the hiding layer 32 is coated a magnetic coating composition which contains 70% by weight or more of magnetic powders having a coercive force of 300 Oe or higher and which has been prepared so that the finally formed magnetic film has a tensile break elongation of 50% or higher, by known coating methods such as gravure coating, roll coating and knife-edge coating, and the coating is dried to form a film of about 1–50μ, preferably about 3–20μ thickness and thus, the magnetic recording layer 31 is formed as shown in FIG. 6(a). The magnetic recording layer 31 is brought into close contact with the whole surface of one side of the substrate 21 consisting of a thermoplastic resin sheet of polyvinyl chloride or the like with adhesive layer 36 interposed therebetween, and is transferred to the substrate 21 by application of pressure or heat and pressure as shown in FIG. 6(b). Then, the support 25 is peeled off. Further, on the transferred hiding layer 32 on the magnetic recording layer 31 are laminated the design layer 41 and the protective layer 33 therefor in succession by various printing means. Thus, the magnetic sheet 11 is obtained as shown in FIG. 6(c).

There is still another method for making the magnetic sheet 11 as shown in FIG. 7. That is, on the peeling layer 35 formed on the support 25 are laminated the protective layer 33 and the design layer 41 in succession by various printing means and on the design layer 41 is formed the hiding layer 32 of 0.01–10μ thickness by known methods. On the whole surface of this hiding layer 32 is coated a magnetic coating composition which contains 70% by weight or more of magnetic powders having a coercive force of 300 Oe or higher and which has been prepared so that the finally formed magnetic film has a tensile break elongation of 50% or higher, by known coating methods such as gravure coating, roll coating and knife-edge coating, and the coating is dried to form a film of about 1-50μ, preferably about 3-20μ thickness and thus, the magnetic recording layer 31 is formed as shown in FIG. 7(a). The magnetic recording layer 31 is brought into close contact with the whole surface of one side of the substrate 21 consisting of a thermoplastic resin sheet of polyvinyl chloride or the like with adhesive layer 36 interposed therebetween, and is transferred to the substrate 21 by application of pressure or heat and pressure as shown in FIG. 7(b). Then, the support 25 is peeled off. Thus, the magnetic sheet 11 is obtained as shown in FIG. 7(b).

The methods for making the magnetic sheet 11 as shown in FIGS. 5, 6 and 7 are called a transfer method and the magnetic recording layer 31 formed by these methods is a transfer layer.

Then, design layer 42 is formed on one side of the substrate 22 by various printing means, and protective layer 34 of a transparent sheet and the above-mentioned magnetic sheet 11 are provided on both the top and under sides of the substrate 22 as shown in FIG. 4 and these are laminated by application of pressure under heating by a hot press or by using adhesives. Thereafter, the resulting laminate is subjected to punching to a desired size, and letters and FIGS. 43 and 44 are formed in the given area by embossing treatment to make the magnetic card 10 having the structure as shown in FIG. 3. Furthermore, electronic parts such as IC may be embedded in this card.

Figure 9:
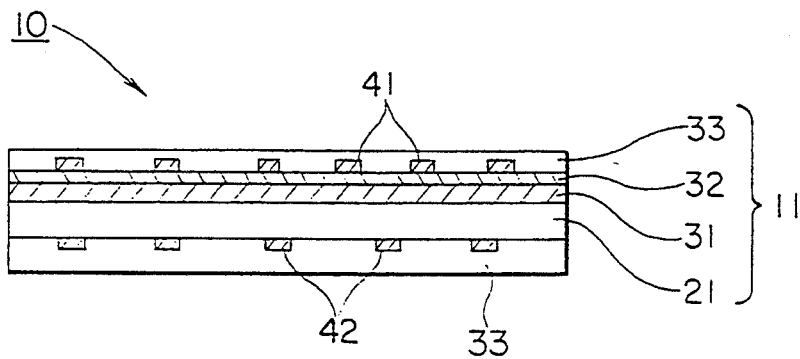

In the above example, the number and the thickness of substrates 21 and 22 and protective layer 34 are not critical and, for example, two-layer structure may be employed by omitting the substrate 22 as shown in FIG. 8, or only one layer of the substrate 21 may be used by omitting also the protective layer 34 as shown in FIG. 9. However, in the case of the one-layer structure, the hot pressing step is omitted and the protective layer 33 is laminated on the design layer 42 by various printing means.

Figure 10:
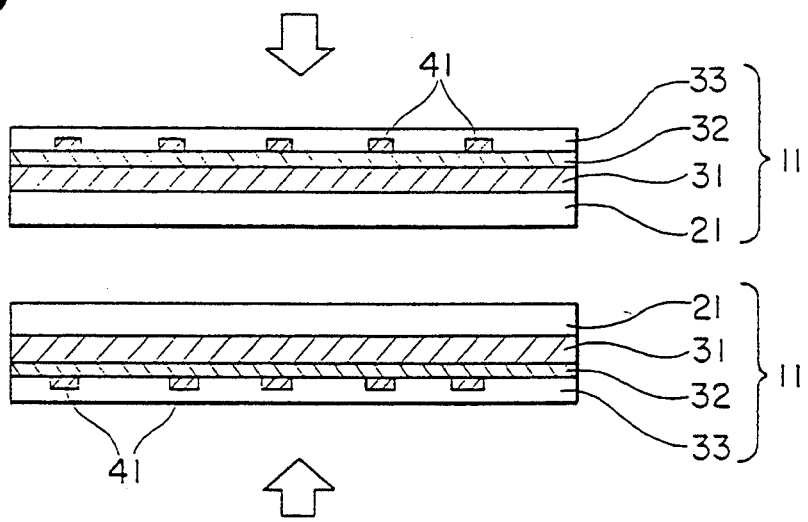
FIG. 10 is a sectional view illustrating a method for producing the magnetic card of the present invention shown in FIG. 11.
Figure 11:
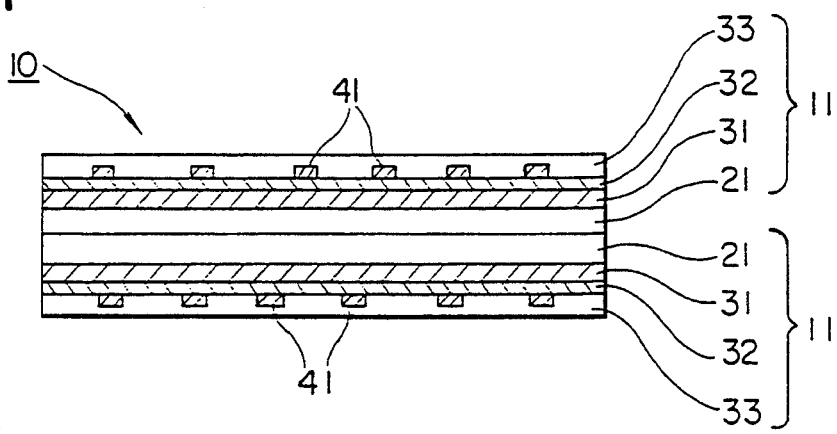

Alternatively, two magnetic sheets 11 are arranged so that the substrates 21 contact with each other as shown in FIG. 10 and are laminated by application of pressure under heating by a hot press or with adhesives. This laminate is subjected to punching to a desired size and letters and FIGS. 43 and 44 are formed in the given area by embossing treatment. In this way, the magnetic card 10 having the structure as shown in FIG. 11 may also be made.

Next, the magnetic recording layer 31 of the magnetic card 10 of the present invention will be explained in detail.

First, at least one resin A selected from the group consisting of vinyl chloride-vinyl acetate copolymer, polyvinyl butyral resin, styrene-maleic acid resin and rosin-modified maleic acid resin is used in an amount of 50% by weight or less, preferably 5-30% by weight of the binder. In this resin A are primarily dispersed magnetic powders having a coercive force of 300 Oe or higher (for example, $\gamma$-$Fe_2O_3$, Co-coated $\gamma$-$Fe_2O_3$, $Fe_3O_4$, $CrO_2$, Fe, Fe—Cr, Fe—Co, Co—Cr, Co—Ni, MnAl, Ba ferrite and Sr ferrite). The amount of the magnetic powders is 70% by weight or more of the finally formed magnetic film.

Then, resin B which is selected from the group consisting of polyester resin, polyurethane resin, ethylene-vinyl acetate copolymer, polyvinyl chloride resin containing a conventional plasticizer and vinyl chloride-vinyl acetate copolymer containing a conventional plasticizer and which has a tensile break strength of 500 $kg/cm^2$ or lower and/or a tensile break elongation of 100% or higher, is used in an amount of 50% by weight or more, preferably 70-95% by weight of the binder. The above primary dispersion is secondarily dispersed in this resin B.

A suitable amount of a polyisocyanate is added, as a curing agent, to the resulting dispersion and they are mixed to obtain a magnetic coating composition. This polyisocyanate is an isocyanate compound of low molecular weight, and by adding this low molecular weight isocyanate compound, abrasion resistance and adhesion of the film are improved, but when it is added in an excess amount, hardness of the film increases highly to cause cracking, peeling and exfoliation of the film in the portion subjected to embossing for forming the desired matters such as letters and figures, and the substrate is exposed and appearance is seriously damaged. Therefore, the addition amount thereof is preferably 30% by weight or less, especially preferably 5-30% by weight based on the binder component. As the polyisocyanates, there may be used many polyisocyanate compounds commercially available as curing agents for polyurethane. For example, there may be cited CORONATE L, CORONATE HL, CORONATE EH, CORONATE 2030, CORONATE 3030, CORONATE 3041, CORONATE 4048, CORONATE 4190, CORONATE 4192, etc. which are polyisocyanates manufactured by Japan Polyurethane Co.

Using the thus prepared magnetic coating composition, a magnetic film is formed on the substrate 21 by coating method or transfer method. Thickness of this magnetic film is about 1-50μ for obtaining good electromagnetic conversion characteristics and is preferably about 3-20μ for obtaining good resolving power. The resulting magnetic film has a tensile break elongation of 50% or higher.

In the case of the tensile break elongation of the magnetic film being less than 50%, when desired matters such as letters and figures are formed in the given positions by embossing treatment after making the magnetic card 10, cracking, peeling and exfoliation of the magnetic film in the embossed portions occur to expose the substrate, whereby the appearance is seriously damaged.

When a resin having neither the tensile break strength of 500 $kg/cm^2$ or lower nor the tensile break elongation of 100% or higher is used as the binder resin B, the resulting magnetic film does not have a tensile break elongation of 50% or higher.

Furthermore, when the content of the magnetic powders in the magnetic film is less than 70% by weight, the resulting films mostly show a tensile break elongation of 50% or higher irrespective of the kind of the binder, and cracking, peeling and exfoliation of the magnetic film in the embossed portions do not occur even when desired matters such as letters and figures are written in the given positions by embossing treatment after formation of the magnetic card 10. However, the electromagnetic conversion characteristics of this magnetic film are inferior to those of the conventional magnetic cards. Although the electromagnetic conversion characteristics can be improved by increasing the thickness of the magnetic film to enhance the output voltage, this method is limited, and rather reduction in resolving power is brought about.

The present invention is actually illustrated by the following Examples and Comparative Examples.

EXAMPLE 1

The magnetic coating composition used in Example 1 was prepared in the following manner.

|  | Part by weight |
| --- | --- |
| Co-coated $\gamma$-$Fe_2O_3$ | 28 |
| Vinyl chloride-vinyl acetate resin (tradename: VAGH manufactured by UCC) | 2 |
| Phosphate ester dispersant (trade name: PHOSPHANOL RE410 manufactured by Toho Chemical Co.) | 1 |
| Toluene | 15 |
| Methyl ethyl ketone (MEK) | 14 |
| Subtotal | 60 |

The above blended composition was mixed and dispersed in a ball mill for 24 hours.

|  | Part by weight |
| --- | --- |
| The dispersion obtained above | 60 |
| Polyester resin ① (tradename: BYRON 300 manufactured by Toyobo Co., Ltd.) | 7 |
| Toluene | 17 |
| MEK | 16 |
| Total | 100 |

The dispersion obtained above was mixed with the polyester resin ① and the solvents at the above mixing ratio, and the mixture was dispersed in a ball mill for 24 hours. To the resulting dispersion was added 2 parts by weight of CORONATE L (manufactured by Japan Polyurethane Co.) which is a polyisocyanate as a curing agent, followed by mixing and stirring to obtain a homogeneous magnetic coating composition. Here, the polyester resin BYRON 300 (manufactured by Toyobo Co., Ltd.) had the characteristics of a tensile break elongation of 700% and a tensile break strength of 50 kg/cm². A magnetic film formed by drying the resulting magnetic coating composition was measured on the characteristics to find that the content of the magnetic powders was 76% by weight and the tensile break elongation of the film was 80%.

Using this magnetic coating composition, a magnetic film of 20μ thickness was formed on a polyvinyl chloride sheet of 100μ thickness by coating method or transfer method. The magnetic sheet 11 shown in FIG. 3 was formed using said sheet, and the magnetic card 10 was produced. Then, the given position of the card 10 was subjected to the embossing treatment for formation of letters. Evaluation was conducted on cracking and peeling of the portion where the letters were formed by embossing and on electromagnetic conversion characteristics of the magnetic recording portion. The results are shown in Table 1.

EXAMPLE 2

The magnetic coating composition used in Example 2 was prepared in the following manner.

|  | Part by weight |
| --- | --- |
| $\gamma$-$Fe_2O_3$ | 30 |
| Polyvinyl butyral resin (tradename: ESRECK BL-1 manufactured by Sekisui Chemical Co., Ltd.) | 2 |
| Zircoaluminate coupling agent (trade name: MANCHEM APG manufactured by Kusumoto Kasei Co.) | 1 |
| Isopropyl alcohol (IPA) | 9 |
| Toluene | 9 |
| MEK | 9 |
| Subtotal | 60 |

The above blended composition was mixed and dispersed in a ball mill for 24 hours.

|  | Part by weight |
| --- | --- |
| The dispersion obtained above | 60 |
| Polycarbonate-polyurethane resin (tradename: DAIFERAMIN MAU9031 manufactured by Dainichiseika Kogyo Co.) | 19 |
| Toluene | 11 |
| MEK | 10 |
| Total | 100 |

The dispersion obtained above was mixed with the polycarbonate-polyurethane resin and the solvents at the above mixing ratio and the mixture was dispersed in a ball mill for 24 hours. To the resulting dispersion was added 2 parts by weight of CORONATE L (manufactured by Japan Polyurethane Co.) which is a polyisocyanate as a curing agent, followed by mixing and stirring to obtain a homogeneous magnetic coating composition. Here, the polycarbonate-polyurethane resin DAIFERAMIN MAU9031 (manufactured by Dainichiseika Kogyo Co.) had the characteristics of a tensile break elongation of 200% and a tensile break strength of 300 kg/cm². Characteristics of a magnetic film formed by drying the resulting magnetic coating composition were measured to find that the content of the magnetic powders was 78% by weight and the tensile break elongation of the film was 52%.

Using this magnetic coating composition, a magnetic card was produced in the same manner as in Example 1, and evaluation was conducted on cracking and peeling of the portion where the letters were formed by embossing and on electromagnetic conversion characteristics of the magnetic recording portion. The results are shown in Table 1.

EXAMPLE 3

The magnetic coating composition used in Example 3 was prepared in the following manner.

|  | Part by weight |
| --- | --- |
| Barium ferrite | 29 |
| Styrene-maleic acid resin (trade name: SUPRAPAL manufactured by BASF) | 2 |
| Phosphate ester dispersant (trade name: PHOSPHANOL RE410 manufactured by Toho Chemical Co.) | 1 |
| IPA | 9 |
| Toluene | 10 |
| MEK | 9 |
| Subtotal | 60 |

| | Part by weight |
|---|---|
| The dispersion obtained above | 60 |
| Polyurethane resin (tradeneme: SEIKABOND U-74 manufactured by Dainichiseika Kogyo Co.) | 26 |
| Toluene | 5 |
| IPA | 4 |
| MEK | 5 |
| Total | 100 |

The dispersion obtained above was mixed with the polyurethane resin and the solvents at the above mixing ratio and the mixture was dispersed in a ball mill for 24 hours. To the resulting dispersion was added 2 parts by weight of CORONATE L (manufactured by Japan Polyurethane Co.) which is a polyisocyanate as a curing agent, followed by mixing and stirring to obtain a homogeneous magnetic coating composition. Here, the polyurethane resin SEIKABOND U-74 (manufactured by Dainichiseika Kogyo Co.) had the characteristics of a tensile break elongation of 300% and a tensile break strength of 200 kg/cm$^2$. Characteristics of a magnetic film formed by drying the resulting magnetic coating composition were measured to find that the content of the magnetic powders was 77% by weight and the tensile break elongation of the film was 58%.

Using this magnetic coating composition, a magnetic card was produced in the same manner as in Example 1, and evaluation was conducted on cracking and peeling of the portion where the letters were formed by embossing and on electromagnetic conversion characteristics of the magnetic recording portion. The results are shown in Table 1.

Comparative Example 1

This comparative example shows an example where the magnetic film had a tensile break elongation of lower than 50%. The magnetic coating composition used in Comparative Example 1 was prepared in the following manner.

| | Part by weight |
|---|---|
| Co-coated γ-Fe$_2$O$_3$ | 28 |
| Vinyl chloride-vinyl acetate resin (tradename: VAGH manufactured by UCC) | 2 |
| Phosphate ester dispersant (tradename: PHOSPHANOL RE410 manufactured by Toho Chemical Co.) | 1 |
| Toluene | 15 |
| MEK | 14 |
| Subtotal | 60 |

The above blended composition was mixed and dispersed in a ball mill for 24 hours.

| | Part by weight |
|---|---|
| The dispersion obtained above | 60 |
| Polyester resin ②  (tradename: BYRON 200 manufactured by Toyobo Co., Ltd.) | 7 |
| Toluene | 17 |
| MEK | 16 |
| Total | 100 |

The dispersion obtained above was mixed with the polyester resin ② and the solvents at the above mixing ratio and the mixture was dispersed in a ball mill for 24 hours. To the resulting dispersion was added 2 parts by weight of CORONATE L (manufactured by Japan Polyurethane Co.) which is a polyisocyanate as a curing agent, followed by mixing and stirring to obtain a homogeneous magnetic coating composition. Here, the polyester resin ②, BYRON 200 (manufactured by Toyobo Co., Ltd.) had the characteristics of a tensile break elongation of 3% and a tensile break strength of 600 kg/cm$^2$. Characteristics of a magnetic film formed by drying the resulting magnetic coating composition were measured to find that the content of the magnetic powders was 76% by weight and the tensile break elongation of the film was 10%.

Using this magnetic coating composition, a magnetic card was produced in the same manner as in Example 1 and evaluation was conducted on cracking and peeling of the portion where the letters were formed by embossing and on electromagnetic conversion characteristics of the magnetic recording portion. The results are shown in Table 1.

Comparative Example 2

Furthermore this comparative example shows an example where the magnetic film had a tensile break elongation of lower than 50%.

The magnetic coating composition used in Comparative Example 2 was prepared in the following manner.

| | Part by weight |
|---|---|
| Barium ferrite | 29 |
| Styrene-maleic acid resin (tradename: SUPRAPAL manufactured by BASF) | 2 |
| Phosphate ester dispersant (trade name: PHOSPHANOL RE 410 manufactured by Toho Chemical Co. | |
| IPA | 9 |
| Toluene | 10 |
| MEK | 9 |
| Subtotal | 60 |

The above blended composition was mixed and dispersed in a ball mill for 24 hours.

| | Part by weight |
|---|---|
| The dispersion obtained above | 60 |
| Polyurethane resin (tradename: SEIKABOND U-74 manufactured by Dainichiseika Kogyo Co.) | 16 |
| Toluene | 9 |
| IPA | 7 |
| MEK | 8 |
| Total | 100 |

The dispersion obtained above was mixed with the same polyurethane resin of resin B and the solvents as in Example 3 at the above mixing ratio and the mixture was dispersed in a ball mill for 24 hours. To the resulting dispersion was added 2 parts by weight of CORONATE L (manufactured by Japan Polyurethane Co.) which is a polyisocyanate as a curing agent, followed by mixing and stirring to obtain a homogeneous magnetic coating composition. Characteristics of a magnetic film formed by drying the resulting magnetic coating composition were measured to find that the content of the magnetic powders was 71% by weight and the tensile break elongation of the film was 42%.

Using this magnetic coating composition, a magnetic card was produced in the same manner as in Example 1 and evaluation was conducted on cracking and peeling of the portion where the letters were formed by embossing and on electromagnetic conversion characteristics of the magnetic recording portion. The results are shown in Table 1.

Comparative Example 3

This comparative example shows an example where the content of the magnetic powders in the magnetic film was less than 70% by weight.

The magnetic coating composition used in Comparative Example 3 was prepared in the following manner.

|  | Part by weight |
| --- | --- |
| Co-coated $\gamma$-Fe$_2$O$_3$ | 24 |
| Vinyl chloride-vinyl acetate resin (tradename: VAGH manufactured by UCC) | 2 |
| Phosphate ester dispersant (tradename: PHOSPHANOL RE410 manufactured by Toho Chemical Co.) | 1 |
| Toluene | 17 |
| MEK | 16 |
| Subtotal | 60 |

The above blended composition was mixed and dispersed in a ball mill for 24 hours.

|  | Part by weight |
| --- | --- |
| The dispersion above | 60 |
| Polyester resin (tradename: BYRON 300 manufactured by Toyobo Co., Ltd.) | 11 |
| Toluene | 14 |
| MEK | 15 |
| Total | 100 |

The dispersion obtained above was mixed with the same polyester resin of resin B and the solvents as in Example 1 at the above mixing ratio and the mixture was dispersed in a ball mill for 24 hours. To the resulting dispersion was added 2 parts by weight of CORONATE L (manufactured by Japan Polyurethane Co.) which is a polyisocyanate as a curing agent, followed by mixing and stirring to obtain a homogeneous magnetic coating composition. Characteristics of a magnetic film formed by drying the resulting magnetic coating composition were measured to find that the content of the magnetic powders was 64% by weight and the tensile break elongation of the film was 95%.

Using this magnetic coating composition, a magnetic card was produced in the same manner as in Example 1 and evaluation was conducted on cracking and peeling of the portion where the letters were formed by embossing and on electromagnetic conversion characteristics of the magnetic recording portion. The results are shown in Table 1.

Methods for Measurement of the Properties

A. Electromagnetic conversion characteristics

Methods of measurement of coercive force H (Oe), squareness ratio Rs (-), and residual magnetic flux (Max/cm):
  Sample vibration type magnetometer (BHV-30 manufactured by Riken Denshi Co.)
  Maximum applied magnetic field: 10 (kOe)
  Size of test piece: 10 mm × 10 mm square
  Magnetization direction: Axis of easy magnetization
  Acceptance or rejection of-the characteristics:
    Squareness ratio: Acceptance—0.7 or higher
    Residual magnetic flux: Acceptance—1.2 or more (Max/cm)

Methods of measurement of resolving power (%) and output voltage (mV):
  Apparatus for measurement of reproduction output of a magnetic card (manufactured by Apollomeck Co. )
  Size of test piece: JIS-II type
  Recording method: Recording of data 0 by F2F modulation method
  Running speed of a card: 190 (mm/sec)
  Head gap: Recording 50 ($\mu$m) , Reproduction 20 ($\mu$m)
  Recording density: 210 (BPI), 420 (BPI)
  Recording current: Writing current (mA) at 90% of saturated output voltage
  Output voltage: Average reproduction output voltage (mV) at the recording with a recording density of 210 BPI
  Resolving power (%): (Average reproduction output voltage (mV) at the recording with a recording density of 420 BPI/output voltage defined above) × 100.
  Evaluation of the characteristics:
    Resolving power: ◯: 90% or higher (good) X: Lower than 90% (bad)
    Output voltage: ◯: 500 mV or higher (good) X: Lower than 500 mV (bad)

B. Properties of film

Method for measurement of tensile break elongation (%)
  In accordance with JIS K5400 (8.8 tensile strength and elongation)
  Thickness of dry film: 20 ($\mu$m)
  Pulling rate: 50 (mm/min)

Method for measurement of the magnetic powder content (%):
  In accordance with JIS K5407 (8. Ash content):
    The magnetic powder content was determined by the ash content in the dried film, Method for measurement of embossing resistance (cracking):
  Embossing treatment: EMBOSSER NE-1000 (manufactured by Nihon Jiken Co.) The embossed portion was directly observed by an optical microscope and the results were graded by the following six criteria (JIS K5500).

| No cracking | 6 |
| --- | --- |
| Hair cracking | 5 |
| Shallow cracking | 4 |
| Crazing | 3 |
| Deep cracking | 2 |
| Alligatoring | 1 |

Evaluation of the property: 6–4: ◯ (good) 3–1: X (bad)

Method for measurement of embossing resistance (peeling):
  Embossing treatment: EMBOSSER NE-1000 (manufactured by Nihon Jiken Co.)
  ① A pressure-sensitive adhesive cellophane tape specified in JIS Z1522 was applied to the embossed portion and rubbed with a rubber eraser specified in JIS S6050 to allow the tape to adhere to the portion.

(2) After elapse of 1-2 minutes, one end of the tape was taken and held at a right angle to the embossed surface and was instantaneously peeled off.

(3) The state of the embossed portion was visually observed and evaluated.

Evaluation of the property:
Evaluation was conducted on magnetic cards of both the coating and transfer types.
No peeling occurred: ◯ (good)
Peeling occurred: X (bad)

All-round evaluation:
◯: Good: Both the electromagnetic conversion characteristics and the film properties were good.
X: Bad: At least one of the electromagnetic conversion characteristics and the film properties was bad.

TABLE 1

|  | Example | | | Comparative Example | | |
|---|---|---|---|---|---|---|
|  | 1 | 2 | 3 | 1 | 2 | 3 |
| Electromagnetic conversion characteristics | | | | | | |
| Coercive force HC (Oe) | 680 | 360 | 2700 | 680 | 2700 | 680 |
| Squareness ratio RS (—) | 0.84 | 0.80 | 0.90 | 0.83 | 0.83 | 0.83 |
| Residual magnetic flux (Max/cm) | 2.24 | 1.75 | 2.35 | 2.20 | 21.2 | 1.85 |
| Resolving power (%) | 94 | 95 | 95 | 93 | 90 | 82 |
| Output voltage (mV) | 580 | 550 | 590 | 560 | 540 | 420 |
| Evaluation of magnetic characteristics | ◯ | ◯ | ◯ | ◯ | ◯ | X |
| Film properties | | | | | | |
| Tensile break elongation (%) | 80 | 52 | 58 | 10 | 42 | 95 |
| Magnetic powder content (%) | 76 | 78 | 77 | 76 | 71 | 64 |
| Embossing resistance, (Coating method) | | | | | | |
| Cracking | ◯ | ◯ | ◯ | X | X | ◯ |
| Peeling | ◯ | ◯ | ◯ | ◯ | X | ◯ |
| Embossing resistance, (Transfer method) | | | | | | |
| Cracking | ◯ | ◯ | ◯ | X | X | ◯ |

TABLE 1-continued

|  | Example | | | Comparative Example | | |
|---|---|---|---|---|---|---|
|  | 1 | 2 | 3 | 1 | 2 | 3 |
| Peeling | ◯ | ◯ | ◯ | ◯ | ◯ | ◯ |
| Over-all evaluation | ◯ | ◯ | ◯ | X | X | X |

As explained above, according to the present invention, inexpensive magnetic cards of stable quality like the conventional ones can be produced and furthermore, the problems in the conventional magnetic cards such as cracking, peeling and exfoliation of the magnetic film in the embossed portion can be solved. Thus, it is possible to produce magnetic cards in which the portions subjected to the embossing are also beautiful and which have good electromagnetic conversion characteristics.

We claim:

1. A magnetic card which comprises a substrate of a thermoplastic resin and a magnetic recording layer mainly composed of magnetic powders, a binder and a polyisocyanate provided on the whole surface of at least one side of the substrate, said binder comprising:
   at least one resin A in an amount of 50% by weight or less, said resin A selected from the group consisting of vinyl chloride-vinyl acetate copolymer, polyvinyl butyral resin, styrene-maleic acid resin and rosin-modified maleic acid resin and:
   a resin B in an amount of 50% by weight or more, said resin B having a tensile strength at break of 500 kg/cm$^2$ or less and a tensile elongation at break of 100% or more, said resin B selected from the group consisting of polyester resin and polyurethane resin;
   wherein embossed portions are formed in a given area; and
   wherein the magnetic recording layer consists of a magnetic film which contains 70% by weight or more of magnetic powders having a coercive force of 300 Oe or higher and which has a tensile elongation at break of 50% or more.

2. A magnetic card according to claim 1, wherein a hiding layer and a design layer are provided in succession on the magnetic recording layer.

3. A magnetic card according to claim 1, wherein the magnetic recording layer is a coating layer or a transfer layer.

4. A magnetic card according to claim 1, wherein an IC is embedded.

5. A magnetic card according to claim 3, wherein an IC is embedded.

* * * * *